United States Patent Office 3,018,268
Patented Jan. 23, 1962

3,018,268
THERMOPLASTIC COMPOSITIONS OF VINYL CHLORIDE RESIN, GRAFT COPOLYMER OF STYRENE AND METHYL METHACRYLATE UPON BUTADIENE-STYRENE RUBBER, AND STYRENE-METHYL METHACRYLATE RESIN, AND METHOD OF MAKING SAME
Lawrence E. Daly, South Bend, Ind., assignor to United States Rubber Company, New York, N.Y., a corporation of New Jersey
No Drawing. Filed June 17, 1958, Ser. No. 742,492
12 Claims. (Cl. 260—45.5)

This invention relates to rigid thermoplastic vinyl halide polymer compositions of improved physical and chemical properties, particularly high impact strength and shock resistant properties.

More particularly, the invention is concerned with a poly blend composed essentially of, an intimate mixture, in particular proportion, of (a) a resinous polyvinyl halide polymer, (b) a graft copolymer of monomeric styrene and monomeric methyl methacrylate on a previously formed rubbery copolymer of butadiene-1,3 and styrene, and (c) a resinous copolymer, in specific proportion, of styrene and methyl methacrylate.

The present invention is an improvement on that of U.S. Patent No. 2,791,600, to Edward G. Schwaegerle, dated May 7, 1957. By replacing the rubbery interpolymer and resin there described, with the present graft copolymer $b$ and with the presently required resinous copolymer $c$ there result a number of advantages, notably superior processing and drawing qualities, and superior properties such as hardness, impact strength, and toughness.

The vinyl halide polymer that is used, includes all of the normally hard, rigid polymeric materials containing predominantly a vinyl halide, i.e., the homopolymers of the vinyl halide, such as polyvinyl chloride, as well as the copolymers made from monomeric mixtures containing a vinyl halide, preferably vinyl chloride, with a lesser amount of any other copolymerizable monoethylenically unsaturated materials including vinylidene halides such as vinylidene chloride, or vinyl esters such as vinyl acetate, or alphaalkyl acrylic acids (acrylic or methacrylic), or their alkyl esters such as ethyl acrylate, methyl acrylate, octyl acrylate, methyl methacrylate, or acrylonitrile, diethyl maleate, or the vinyl aromatic compounds such as styrene, and chlorostyrene. The vinyl halide polymers preferably used in the invention are polyvinyl chloride or the vinyl chloride copolymers which contain, by weight, only a minor proportion (e.g., 1 to 25%) of other copolymerized monolefinic monomers such as the copolymers of 75 to 99% vinyl chloride and 1 to 25% vinylidene chloride, or for example, 80 to 98% vinyl chloride and 2 to 20% polyvinyl acetate.

When the three components $a$, $b$, and $c$ above are intimately mixed, as hereinafter described, the hard, rigid compositions of the present invention are unexpectedly shock resistant and also have excellent molding and vacuum forming properties. The novel composition can be calendered into sheet, extruded, molded, drawn, embossed, and machined to form many useful articles of manufacture.

The vinyl halide polymers $a$ may be made by any of the known methods employed by those skilled in the art. The preferred form, when used, is the solid dried product, either powder or granular. If desired, emulsion types, in emulsion form, can be blended with emulsions of the other polymeric constituents of the invention before being coprecipitated and dried (e.g., emulsions of the vinyl halide polymer and styrene-methyl methacrylate resin may be so blended). A preferred technique is to prepare the vinyl chloride polymer or copolymer in an aqueous medium containing a protective colloid or other surface-active agent in order to obtain an aqueous suspension of polymer in the form of fine uniform grains or "pearls." For the latter purpose, gelatin, casein, bentonite clay, starch derivatives, polyvinyl alcohol, polyacrylic acid or a salt thereof, hydrolyzed vinyl acetate polymers, and others may be utilized. When a polymeric emulsion is desired, the polymerization is carried out in the presence of an efficient emulsifying agent such as the fatty acid soaps including sodium oleate, potassium oleate, potassium palmitate, sodium myristate and the like; the hymolal sulfates such as sodium isopropyl naphthalene sulfonate, the sodium salts of alkyl benzene and alkyl naphthalene sulfonic acids, the sodium salt of n-octadecyl-N-1,2-dicarboxyethyl sulfosuccinamate and others.

The resinous copolymer $c$ of styrene and methyl methacrylate may be prepared by copolymerizing about 33 parts of styrene with about 67 parts of methyl methacrylate, in solution, in mass, or in an aqueous medium by suspension, or by emulsion polymerization techniques. The preferred aqueous polymerization medium may contain one of the above mentioned colloidal or surface-active agents to obtain a suspension, or an emulsifying agent to obtain a polymer dispersion or latex. An example of a preparation of a suitable copolymer resin is as follows:

| | Parts |
|---|---|
| Styrene monomer | 33 |
| Methyl methacrylate monomer | 67 |
| Soap ("SF flakes," a tallow soap of commerce consisting mainly of sodium stearate and sodium oleate) | 5 |
| Potassium persulfate | 0.5 |
| Mixture of dodecyl (60%), tetradecyl (20%) and hexadecyl (20%) tertiary mercaptans (referred to in the trade as "MTM-4") | 0.05 |
| Water | 180 |

Polymerize approximately 5 hours at 50° C. to give 95–100% conversion.

The graft copolymer $b$ is preferably made of a graft of about 33 parts of monomeric styrene and about 67 parts of monomeric methyl methacrylate upon about 100 parts of a rubbery copolymer of about 70–85 parts of butadiene-1,3 and, correspondingly, 30–15 parts of styrene. However, the proportion of resin-forming monomers (styrene and methyl methacrylate) polymerized in the rubber to form the graft copolymer may vary from 10 to 200 parts (preferably 33 to 100 parts), per 100 parts of rubber.

The resinous graft copolymer $b$ employed is prepared by emulsion polymerization in accordance with the known technique of "grafting" resin-forming components onto a rubber, by emulsion polymerizing the resin-forming monomers (in this case styrene, and methyl methacrylate) in a latex of the previously prepared rubber (in this case a latex of a styrene-butadiene-1,3 copolymer rubber). It is considered that, in this way, a substantial proportion of the resin monomers become an actual part of the previously formed rubber molecule, to form the graft copolymer which has different properties from the separately prepared rubber, or form a simple interpolymer of all the monomers together. For preparing the graft copolymer, the emulsion of the butadiene-styrene rubber should be substantially free from monomeric butadiene.

The following procedure may be followed in preparing the graft copolymer component:

STEP 1.—PREPARATION OF RUBBERY COPOLYMER LATEX FOR GRAFT POLYMERIZATION:

| | Parts |
|---|---|
| Butadiene monomer | 80 |
| Styrene monomer | 20 |
| Soap ("SF flakes") | 5 |
| Potassium hydroxide | 0.25 |
| Potassium persulfate | 0.5 |
| Mixed tertiary alkyl mercaptans ("MTM-4") | 0.05 |
| Water | 180 |

Polymerize for a sufficient length of time (e.g., 20 hours)

at 50° C., as required to give 85–100% conversion (if any unreacted monomers remain, they should be stripped off).

STEP 2.—GRAFT COPOLYMERIZATION

| | Parts |
|---|---|
| Rubber solids (as latex produced in Step 1 above) | 100 |
| Styrene monomer | 33 |
| Methyl methacrylate monomer | 67 |
| Potassium persulfate | 0.5 |
| Mixed tertiary alkyl mercaptans ("MTM–4") | 0.5 |
| Water (total) | 300 |

Polymerize for about 3–7 hours at 50° C., as required to give a conversion of 90–100%.

The resultant latex may be coagulated to recover the graft copolymer for mill-mixing with the other components, or the latex may be used for blending with the other components in latex form, in which case the whole is coagulated after thorough mixing, and the entire mass further worked or masticated under heat and pressure to insure homogeneity.

A preferred composition contains, by weight, from about 70 to 98 parts of the vinyl halide polymer a, and correspondingly from about 30 to 2 parts of a 55/45 blend of the graft copolymer b and the styrene-methyl methacrylate copolymer resin c, or the latter two components may be incorporated with the vinyl halide separately in the same proportions. The composition may vary from 51–98 parts of the vinyl halide polymer and correspondingly from 49–2 parts of a blend of the graft copolymer and the styrene methyl methacrylate copolymer resin. Further, the blend of the graft copolymer and the styrene-methyl methacrylate copolymer can vary from 75–25 parts of the graft copolymer and correspondingly from 25–75 parts of the styrene-methyl methacrylate copolymer. It is very important that the vinyl halide portion be at least 51% of the composition. It is only by the said proportions, including a major proportion of the vinyl halide polymer, that the desired characteristic of the vinyl halide polymer can be maintained, i.e., fire resistance, hardness and inertness to corrosive chemicals, while at the same time imparting the new characteristics of the present mixture.

In the practice of the invention the various components may be blended or mixed in any order. It is generally preferred that the blended components be worked or masticated under heat and pressure to insure efficient dispersion. In general, temperatures of from 250° F. to 350° F. are sufficient to obtain efficient dispersion of the components of the compositions on rubber mills or in Banbury type mixers.

The following examples demonstrate specific embodiments of the invention and methods employed in the practice of the invention, parts being by weight:

*Example 1*

85 parts of polyvinyl chloride resin powder ("Geon 103") and 15 parts of a blend of the graft copolymer of styrene and methyl methacrylate on the rubbery copolymer of butadiene and styrene (prepared as described in detail above, containing 15% styrene in the rubber, the ratio of rubber to resin being 50:50, and the ratio of styrene to methyl methacrylate in the resin being 33:67) and the copolymer of styrene and methyl methacrylate (33:67) in the ratio of 55 parts graft copolymer and 45 parts of the styrene-methyl methacrylate resin were blended on a two-roll mill. The temperatures of the rolls were maintained at 300–310° F. (Two parts of any suitable conventional stabilizer for polyvinyl chloride resin, e.g., tin dilaurate or the tin sulfur compound of U.S. Patent No. 2,648,650, to Elliott L. Weinberg and Ernest W. Johnson, dated August 11, 1953, may be incorporated during a five minute blending cycle.) The blended composition was calendered into 20 mil thickness sheet at roll temperatures of 300–320° F. The resulting product was cut and seven plies were molded for 10 minutes in a standard test mold in a steam-heated platen press at 320° F. under pressures of 500 lbs. per square inch. The following test result was obtained on the press molded sample:

| | |
|---|---|
| Izod impact—ft. pounds per inch of notch | 11.7 |
| Rockwell Hardness ("R" Scale) | 112 |

*Examples 2–9*

The following examples were made in the same manner as the composition of Example 1. The tests on all of these examples were standard ASTM tests. The tremendous improvement, as shown in Table I, in impact strength of the vinyl halide polymers modified with the graft copolymer (same as in Example 1) and the styrene-methyl methacrylate resin (same as in Example 1) is demonstrated in these examples. The improvement in impact strength was quite unexpected in view of the relatively low impact strength of the vinyl halide polymers and the graft copolymer-styrene/methyl methacrylate resin blend. Examples 2, 3 and 9 are outside the invention. Examples 5–8 represent a preferred practice.

Other ingredients such as color pigments, plasticizers, extenders, stabilizers for the vinyl halide polymers can be incorporated in the compositions of the invention, if desired.

TABLE I

| Example | 2 | 3 | 4 | 5 | 6 | 7 | 8 | 9 |
|---|---|---|---|---|---|---|---|---|
| Vinyl chloride polymer (Geon 103; sp. g. 7.4) | 100 | | 90 | 85 | 80 | 60 | | |
| Vinyl halide copolymer: Vinyl chloride 95 parts and Vinyl acetate 5 parts | | 100 | | | | | 85 | |
| Blend of 55 parts of the graft copolymer and 45 parts styrene-methyl methacrylate resin | | | 10 | 15 | 20 | 40 | 15 | 100 |
| Stabilizer (per Example 1) | 2 | 2 | 2 | 2 | 2 | 2 | 2 | |
| Rockwell Hardness (R Scale) | 116 | 115 | 114 | 112 | 110 | 100 | 110 | 64 |
| Charpy Notched Impact Strength | 4.4 | 1.22 | 8.9 | 11.7 | 15.4 | 19.3 | 19.2 | 6.2 |
| Tensile Strength | 7,940 | 7,930 | 7,440 | 7,040 | 6,680 | 4,750 | 7,210 | 4,720 |
| Elongation (Percent) | 123 | 135 | 122 | 121 | 109 | 92 | 112 | 17 |
| Modulus of rupture | 13,410 | 13,000 | 12,200 | 11,390 | 10,460 | 7,390 | 10,530 | 4,720 |
| Modulus of Elasticity (in flexure) | 398,000 | 417,000 | 382,000 | 358,000 | 355,000 | 293,000 | 370,000 | 173,000 |
| Vacuum molding properties Blank at 320° F. | Poor | Poor | Fair | Good | Good | Good | Good | Good |

Having thus described my invention, what I claim and desire to protect by Letters Patent is:

1. A thermoplastic composition comprising a homogeneous mixture of 51% to 98% of (a) a resinous vinyl chloride polymer selected from the group consisting of polyvinyl chloride and copolymers consisting of from 75% to 99% of vinyl chloride with correspondingly from 25% to 1% of a copolymerizable monoolefinically unsaturated monomer, and correspondingly 49% to 2% of (b) a graft copolymer of from 10 to 200 parts of a mixture of styrene and methyl methacrylate in ratio of 33:67 graft copolymerized upon 100 parts of a rubbery copolymer, in aqueous emulsion form, of butadiene and styrene in ratio of from 70:30 to 85:15, and (c) a resinous copolymer of styrene and methyl methacrylate in ratio of 33:67, the amounts of (b) and (c) ranging from 75 to 25 parts of (b) and correspondingly from 25 to 75 parts of (c) per 100 parts of (b) plus (c), the said percentages and parts being by weight.

2. A hard, tough, rigid, processable thermoplastic composition comprising a homogeneous mixture of 70% to 98% of (a) a resinous vinyl chloride polymer selected from the group consisting of polyvinyl chloride and copolymers consisting of from 75% to 99% of vinyl chloride with correspondingly from 25% to 1% of a copolymerizable monoolefinically unsaturated monomer, and correspondingly 30% to 2% of (b) a graft copolymer of from 10 to 200 parts of a mixture of styrene and methyl methacrylate in ratio of 33:67 graft copolymerized upon 100 parts of a rubber copolymer, in aqueous emulsion form, of butadiene and styrene in ratio of from 70:30 to 85:15, and (c) a resinous copolymer of styrene and methyl methacrylate in ratio of 33:67, the amounts of (b) and (c) ranging from 75 to 25 parts of (b) and correspondingly from 25 to 75 parts of (c) per 100 parts of (b) plus (c), the said percentages and parts being by weight.

3. A thermoplastic composition comprising a homogeneous mixture of 51% to 98% of (a) a resinous vinyl chloride polymer selected from the group consisting of polyvinyl chloride and copolymers consisting of from 75% to 99% of vinyl chloride with correspondingly from 25% to 1% of a copolymerizable monoolefinically unsaturated monomer, and correspondingly 49% to 2% of (b) a graft copolymer of from 10 to 200 parts of a mixture of styrene and methyl methacrylate in ratio of 33:67 graft copolymerized upon 100 parts of a rubbery copolymer, in aqueous emulsion form, of butadiene and styrene in ratio of from 70:30 to 85:15, and (c) a resinous copolymer of styrene and methyl methacrylate in ratio of 33:67, the ratio of (b) to (c) being 55:45, the said percentages and parts being by weight.

4. A hard, tough, rigid, processable thermoplastic composition comprising a homogeneous mixture of 70% to 98% of (a) a resinous vinyl chloride polymer selected from the group consisting of polyvinyl chloride and copolymers consisting of from 75% to 99% of vinyl chloride with correspondingly from 25% to 1% of a copolymerizable monoolefinically unsaturated monomer, and correspondingly 30% to 2% of (b) a graft copolymer of from 10 to 200 parts of a mixture of styrene and methyl methacrylate in ratio of 33:67 graft copolymerized upon 100 parts of a rubbery copolymer, in aqueous emulsion form, of butadiene and styrene in ratio of from 70:30 to 85:15, and (c) a resinous copolymer of styrene and methyl methacrylate in ratio of 33:67, the ratio of (b) to (c) being 55:45, the said percentages and parts being by weight.

5. A hard, tough, rigid, processable thermoplastic composition comprising a homogeneous mixture of 60% to 90% of (a) polyvinyl chloride resin and correspondingly 40% to 10% of (b) a graft copolymer of 100 parts of a mixture of styrene and methyl methacrylate in ratio of 33:67 graft copolymerized upon 100 parts of a rubbery copolymer, in aqueous emulsion form, of butadiene and styrene in ratio of from 70:30 to 85:15, and (c) a resinous copolymer of styrene and methyl methacrylate in ratio of 33:67, the amounts of (b) and (c) ranging from 75 to 25 parts of (b) and correspondingly from 25 to 75 parts of (c) per 100 parts of (b) plus (c), the said percentages and parts being by weight.

6. A hard, tough, rigid, processable thermoplastic composition comprising a homogeneous mixture of 60% to 90% of (a) polyvinyl chloride resin and correspondingly 40% to 10% of (b) a graft copolymer of 100 parts of a mixture of styrene and methyl methacrylate in ratio of 33:67 graft copolymerized upon 100 parts of a rubbery copolymer, in aqueous emulsion form, of butadiene and styrene in ratio of from 70:30 to 85:15, and (c) a resinous copolymer of styrene and methyl methacrylate in ratio of 33:67, the ratio of (b) to (c) being 55:45, the said percentages and parts being by weight.

7. A hard, tough, rigid, processable thermoplastic composition comprising a homogeneous mixture of 60% to 90% of (a) polyvinyl chloride resin and correspondingly 40% to 10% of (b) a graft copolymer of from 33 to 100 parts of a mixture of styrene and methyl methacrylate in ratio of 33:67 graft copolymerized upon 100 parts of a rubbery copolymer, in aqueous emulsion form, of butadiene and styrene in ratio of from 70:30 to 85:15, and (c) a resinous copolymer of styrene and methyl methacrylate in ratio of 33:67, the ratio of (b) to (c) being 55:45, the said percentages and parts being by weight.

8. A hard, tough, rigid, processable thermoplastic composition comprising a homogeneous mixture of 60% to 90% of (a) polyvinyl chloride resin and correspondingly 40% to 10% of (b) a graft copolymer of from 10 to 200 parts of a mixture of styrene and methyl methacrylate in ratio of 33:67 graft copolymerized upon 100 parts of a rubbery copolymer, in aqueous emulsion form, of butadiene and styrene in ratio of from 70:30 to 85:15, and (c) a resinous copolymer of styrene and methyl methacrylate in ratio of 33:67, the ratio of (b) to (c) being 55:45, the said percentages and parts being by weight.

9. A hard, tough, rigid, processable thermoplastic composition comprising a homogeneous mixture of 85% of (a) a resinous vinyl chloride polymer selected from the group consisting of polyvinyl chloride and copolymers consisting of from 75% to 99% of vinyl chloride with correspondingly from 25% to 1% of a copolymerizable monoolefinically unsaturated monomer, and correspondingly 15% of (b) a graft copolymer of from 33 to 100 parts of a mixture of styrene and methyl methacrylate in ratio of 33:67 graft copolymerized upon 100 parts of a rubbery copolymer, in aqueous emulsion form, of butadiene and styrene in ratio of from 70:30 to 85:15, and (c) a resinous copolymer of styrene and methyl methacrylate in ratio of 33:67, the ratio of (b) to (c) being 55:45, the said percentages and parts being by weight.

10. A hard, tough, rigid, processable thermoplastic composition comprising a homogeneous mixture of 85% of (a) a resinous vinyl chloride polymer selected from the group consisting of polyvinyl chloride and copolymers consisting of from 75% to 99% of vinyl chloride with correspondingly from 25% to 1% of a copolymerizable monoolefinically unsaturated monomer, and correspondingly 15% of (b) a graft copolymer of from 10 to 200 parts of a mixture of styrene and methyl methacrylate in ratio of 33:67 graft copolymerized upon 100 parts of a rubbery copolymer, in aqueous emulsion form, of butadiene and styrene in ratio of from 70:30 to 85:15, and (c) a resinous copolymer of styrene and methyl methacrylate in ratio of 33:67, the ratio of (b) to (c) being 55:45, the said percentages and parts being by weight.

11. A composition as in claim 10, in which the said resinous vinyl chloride polymer is polyvinyl chloride itself.

12. A method of processing normally hard, tough and unplasticized polyvinyl chloride which comprises mixing, by weight, 70 to 98 parts of the polyvinyl chloride with 30 to 2 parts of a blend of the graft copolymer of claim 1 and the styrene-methyl methacrylate resin copolymer, said blend being composed, by weight, of about 55% of the graft copolymer and about 45% of the styrene-methyl methacrylate resin, and masticating the resulting mixture at a temperature of about 250° F. to about 350° F. to a homogeneous mass.

References Cited in the file of this patent

UNITED STATES PATENTS

| 2,753,322 | Parks et al. | July 3, 1956 |
| 2,791,600 | Schwaegerle | May 7, 1957 |
| 2,843,561 | Ingley et al. | July 15, 1958 |
| 2,943,074 | Feuer | June 28, 1960 |

FOREIGN PATENTS

| 726,583 | Great Britain | Mar. 23, 1955 |